RE 25184

Dec. 13, 1960 J. C. McADAM 2,964,688

HEAT DISSIPATORS FOR TRANSISTORS

Filed Aug. 3, 1959 3 Sheets-Sheet 1

INVENTOR.
JOHN C. McADAM
BY
Beehler & Shanahan
ATTORNEYS

Dec. 13, 1960 J. C. McADAM 2,964,688

HEAT DISSIPATORS FOR TRANSISTORS

Filed Aug. 3, 1959

3 Sheets-Sheet 2

INVENTOR.
JOHN C. McADAM

BY
Beehler & Shanahan
ATTORNEYS

Dec. 13, 1960 J. C. McADAM 2,964,688

HEAT DISSIPATORS FOR TRANSISTORS

Filed Aug. 3, 1959

3 Sheets-Sheet 3

INVENTOR.
JOHN C. MCADAM
BY
Beehler & Shanahan
ATTORNEYS

United States Patent Office 2,964,688

Patented Dec. 13, 1960

2,964,688

HEAT DISSIPATORS FOR TRANSISTORS

John C. McAdam, Burbank, Calif., assignor to International Electronic Research Corporation, Burbank, Calif., a corporation of California Filed Aug. 3, 1959, Ser. No. 831,427

12 Claims. (Cl. 317—234)

The invention relates to heat dissipators for electronic components and particularly one adapted to the cooling of transistors together with a method of applying thereto a coating, thereby to give the device a highly desired dielectric characteristic.

During recent years it has been discovered that the efficiency of electronic components of certain types and particularly electronic tubes is very materially increased by the proper dissipation of heat which is generated while the tube is functioning. This discovery has given rise to the development of a number of heat dissipators for electronic components of this general character which have improved the performance of the components as well as protecting them against vibrations. The shields, however, which have been developed heretofore, have been of such construction that, though readily usable on electronic tubes and even small electronic tubes, have not been of such design as would permit them to be attached to components as small as transistors or components of the relative shape and size of transistors.

Some types of devices have incorporated spring elements which, when attached, have created a snapping action. Although such an action may not have been objectionable in many instances where an electronic tube has been involved, when a snap acting device has been used with transistors, the shock frequently damages the contact between the transistor elements sufficient to render them defective.

Further still, transistors are of such character that they cannot support heating above a certain optimum temperature and thereafter be expected to regain their ability to perform. In this respect transistors are unlike electronic tubes which, even when overheated, only temporarily lose their effectiveness which is regained upon cooling to below the optimum temperature. Heating of transistors above the optimum temperature not only impairs their effectiveness, but, in fact, actually destroys the bond between the materials which is not regained upon cooling and the transistors are rendered useless.

Another factor lies in the fact that many transistors have a surrounding jacket or casing which is in fact one of the electric leads of the transistor and hence, for transistors of this kind, a dissipating device which makes an electric contact as well as a thermal contact with the transistor is of no value because it impairs the electric performance of the transistor.

It is, therefore, among the objects of the invention to provide a new and improved heat dissipator for transistors which can be smoothly applied to the transistor without prospect of a damaging physical shock and which once in place will retain itself in position and very materially improve the removal of heat from the transistor by convection and radiation.

Another object of the invention is to provide a new and improved heat dissipator for transistors which when applied to the transistor makes available an exceedingly large heat dissipating area within a relatively compact space thereby making it possible to employ to the fullest extent the advantages of the transistor which is inherent in its very small and compact size.

Still another object of the invention is to provide a new and improved heat dissipator for transistors which attaches to the transistor by use of an electrically non-conducting contact which, at the same time, is an effective heat conducting contact.

A further object of the invention is to provide a new and improved heat dissipator for transistors which, although snugly gripping the transistor at one area, nevertheless provides an abundance of space and heat dissipating surfaces immediately adjacent the transistor of such design and character as to very materially improve the transfer of heat away from the transistor and which, although providing the necessary tight grip of the device upon the transistor, nevertheless is able to accommodate wide tolerances without losing the effectiveness of the grip when heated to temperatures far above the initial operating range.

Still further among the objects of the invention is to provide a new and improved heat dissipator for transistors which incorporates a coating such that it provides an effective electrical non-conducting film through which heat can readily pass, and which, at the same time, provides a film having a low coefficient of friction thereby to greatly facilitate sliding the device on and off the transistor without damaging either the transistor or the shield.

With these and other objects in view, the invention consists of the construction, arrangement, and combination of the various parts of the device whereby the objects contemplated are attained, as hereinafter set forth, pointed out in the appended claims, and illustrated in the accompanying drawings.

Figures 1, 2:
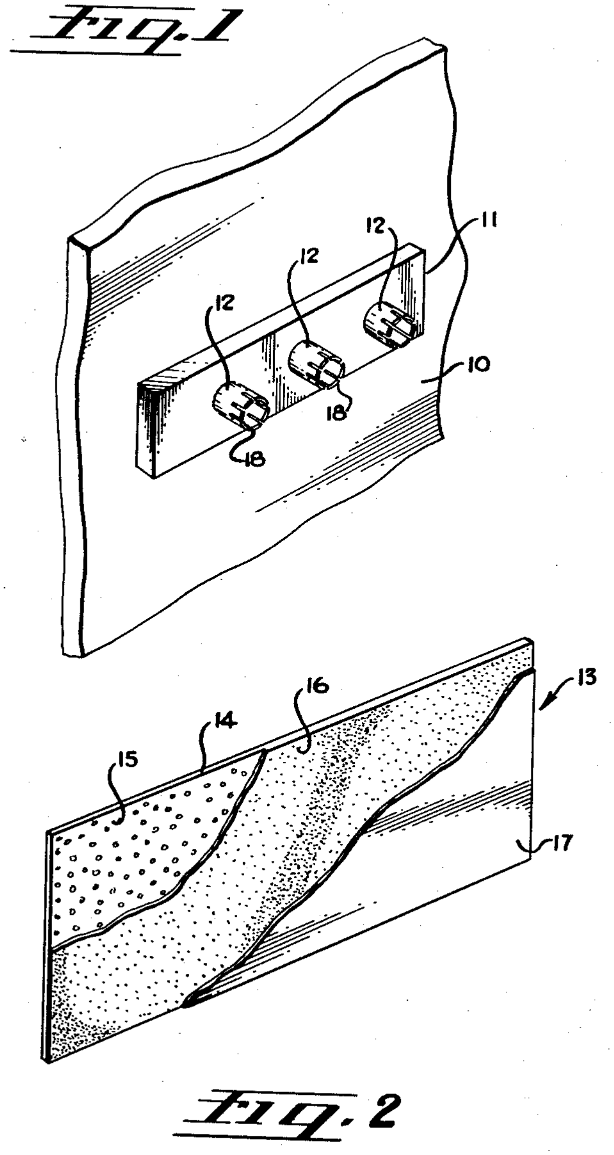
Figure 1 is a fragmentary perspective view of a base or chassis showing a typical manner in which a group of transistors may be attached thereto.
Figure 2 is a fragmentary perspective view of a sheet of material illustrating the manner in which coating is secured thereon.

In one embodiment of the invention chosen for the purpose of illustration there is suggested in Figure 1 a wall 10 which can be considered as the wall or casing of a unit in which transistors are to be mounted for operation. The wall may on occasions be of metal and consequently electrically conductive material. By way of illustration further, there is shown a plate 11 which is preferably also of metal because of the heat conducting and heat dissipating character of metal. In appreciating the subject matter of the invention herein disclosed, attention is called to the common practice of using heat sinks in connection with the mounting of transistors. It is well known that one of the important factors in use of transistors in electronic circuits lies in the fact that transistors are very small and compact. For this reason, somewhat complicated circuits can be housed in a relatively small space as compared with the same circuit equipped with conventional electronic tubes. While it may be true that for such service as individual radio receivers and comparable low power installations, the package containing the circuit and transistors can be small, other occasions where larger amounts of power are involved necessitate providing some adequate means for dissipating heat which is generated when the transistors are operating. In practice it has been found that for many types of transistors, it is necessary to have a heat sink of one or more square feet in order to carry away the heat generated at a sufficiently rapid rate to maintain efficient and effective performance of the transistor in the circuit. In point of fact, certain transistors will operate efficiently and effectively up to approximately 90° centigrade, but when heat is not dissipated and the heat in the transistor jacket builds up to temperatures above 90°, the bond between the crystal member and the alloy member in the transistor breaks down and destroys the effectiveness of the unit.

Obviously when a heat sink of the area found necessary is used for transistors, it is no longer possible to make a compact package for circuits in which the transistors are used despite the fact that the transistor elements occupy only a very small space.

The amount of area of the heat sink, however, can be considerably reduced by use of heat dissipators 12 which are illustrated in Figure 1. In order to take full advantage of the prospect of heat dissipation which is afforded by the wall of the casing, the dissipators 12 may be mounted upon the plate 11 so that heat absorbed by the dissipators is transferred to the plate for dispersion and, on those occasions where the wall 10 is metal, also to the wall. A difficulty arises, however, in view of the fact that the engagement of dissipators 12 with the plate 11 to be an effective means of heat conduction is commonly also a contact which is electrically conductive.

Moreover, many types of transistors are built in such fashion that the transistor jacket consists of a metal jacket to which one of the leads of the transistor is attached. Hence, it is not feasible for the transistor jacket to be engaged by the transistor dissipator under ordinary circumstances because in the characteristic setup illustrated in Figure 1 the transistor would be grounded to the plate 11 and the wall 10.

To avoid grounding there is provided for the dissipators a coating 13 of the type illustrated in Figure 2. To make an effective coating, a piece of sheet metal 14 which forms the material of which the dissipators 12 are built is initially made to present a porous surface 15. Various effective means can be used for this purpose such as sand blasting or acid dipping. The important thing is to have the surface clean and porous to provide for good mechanical adhesion of the coating 13.

Upon the porous surface thus prepared the coating is applied. The coating must necessarily be electrically non-conductive and at the same time capable of transmitting heat by conduction. These two properties are normally incompatible. Hence, the coating 13 must be especially prepared and of a special character. Excellent results have been achieved for transistor dissipators by making use of a coating having a thickness of from about .0005 to .001 inch of a composite filled plastic material consisting of a synthetic plastic polymerized resin in which is mixed finely powdered molybdenum disulphide. These two materials may be mixed together and applied as a single film if desired. The ultimate thicknes should be not more than .001 inch. Good results, however, are also achieved by applying first to the porous surface 15 a layer or film 16 of the same synthetic plastic resin during which step a positive bond is assured between the porous surface and the resin, and thereafter coating the resin with a layer or film 17 of the molybdenum disulphide. The films 16 and 17 may vary in thickness between .0005 inch and a thickness appreciably less than .001 inch, care being taken to have the film thickness so proportioned that the thickness of both films in the aggregate is not greater than .001 inch. When the two step method is made use of, the molybdenum disulphide is applied before the film of synthetic plastic is firmly set inasmuch as to supply a satisfactory coating 13, the plastic is a thermo-setting plastic. Once the plastic has taken its set, it is bonded permanently on one side to the porous surface 15 of the aluminum material and bonded also by the same process to the molybdenum disulphide, whether the disulphide be mixed initially with the plastic or applied subsequently as a film 17. The proportion of molybdenum disulphide to plastic is sufficiently low to permit the plastic in its thermo-set condition to be present on the exposed surface, thereby to provide a surface having a particular coefficient of friction.

An acceptable proportion of plastic to disulphide is 20% to 80% respectively.

The material forming the dissipators 12 may be coated with the coating 13 after being formed into dissipators as shown, or, prior thereto, where the dissipators are made entirely of sheet metal material. In their final form, spring fingers 18 of the dissipators are coated throughout and particularly around the inner edges at the free ends so that when transistors are pressed into position of engagement with the fingers, they can be easily slid into position aided by what may be considered as the solid lubricant which is inherent in the coating, and hence, even though the fingers provide a desirable tight fit and tight grip upon the transistor jacket, the transistor can be pushed into place freely without any snap action taking place such as would otherwise likely damage the transistor parts; and once in place, the engagement of the fingers with the transistor jacket will be tight enough to hold it effectively in position.

A further effect is also inherent in the coating material in that in thicknesses of .0005 to .001 inch the coating has an electrically insulating value of substantially one thousand (1,000) volts per mil of thickness, but because the thickness is less than .001 inch and because of the character of the composition forming the coating, it is at the same time an effective transmitter of heat. In the two film type of coating above described, the molybdenum disulphide surface coating has been found to possess an electrically insulating value of from three hundred (300) to four hundred (400) volts per mil of thickness, the balance being supplied by the plastic film 16.

A further important characteristic of the coating herein described lies in the fact that no dead air spaces are permitted to be present in the body of the coating and the coating is non-hygroscopic.

Further still, by reason of the fact that the dissipator is coated throughout its entire exterior surface, contact between the dissipator 12 and the plate 11 is also a non-electrically conductive contact, and at the same time, because of the very thin nature of the film is a contact capable of conducting heat picked up by the transistor dissipator to the plate thereby to materially improve the dissipation of heat.

Figure 3:
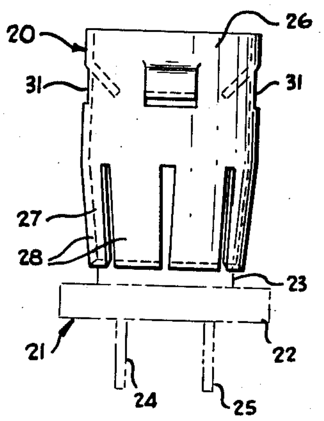
Figure 3 is a side elevational view of one form of the device shown attached to a transistor.
Figure 4:
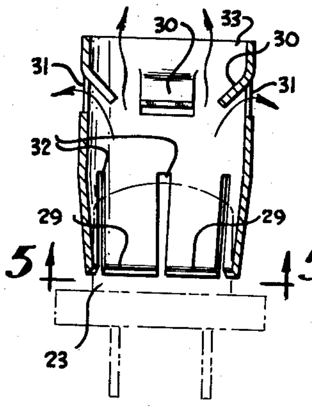
Figure 4 is a longitudinal sectional view of the device of Figure 3 taken on the line 4—4 of Figure 5.
Figure 5:
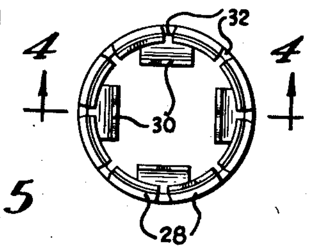
Figure 5 is a bottom end view of the device taken on the line 5—5 of Figure 4.

In the form of device illustrated in Figures 3, 4 and 5, there is shown a dissipator 20 adapted to be applied to a transistor 21 shown by broken lines, the transistor having a base 22 and jacket 23 and presenting leads 24 and 25. It will be appreciated, of course, that transistors vary appreciably with respect to proportions and construction as well as physical form, and especially in dimension, there not having been as yet provided standard tolerances and dimensions for the commonly used transistors. The transistor 21, here shown, is for the purpose of illustration, only, as one upon which the dissipator 20 may be mounted and used effectively.

The dissipator comprises an end 26 which is circumferentially continuous and an end 27 which is made up of a multiple number of spring fingers 28. The spring fingers are directed obliquely inwardly toward the transistor jacket and, as illustrated in Figure 4, it will be noted that the inside diameter of the end 26 is somewhat larger than the outermost diameter of the jacket 23 so that the fingers, only, engage the jacket and these only along edge portions 29. The edge portions are preferably smoothly rounded so that they do not dig into nor tend to dig into the surface of the jacket, but instead provide a smooth sliding contact to make it easy to slide the dissipator into place upon the transistor and to remove it therefrom. In the event that the jacket be coated with a thermo-plastic coating composition similar to that hereinabove described, whether or not it be electrically non-conductive, the presence of the plastic material on the edge portions further improves the ease of sliding the dissipator into and out of position. Moreover, by reason of the fact that the coating is black, it will absorb heat radiated from the transistor jacket upon the inside surface of the dissipator and in that manner provide for the dissipation of heat generated in the transistor by radiation.

To also improve the dissipation of heat by convection, a series of tabs 30 are stamped from the wall of the end portion 26 of the dissipator and bent inwardly to form openings 31. In the chosen embodiment there are four openings and four tabs. It will be noted that the tabs slope obliquely inwardly and do not extend clear across the interior of the dissipator. Constructed in this fashion, heat arising from the transistor jacket sets up a convection current such as to draw the cooler air inwardly between slits 32 formed between the fingers 28 and this air, when heated, passes upwardly in a somewhat turbulent flow, some of the air following the direction of the arrows outwardly through the openings 31 deflected by the tabs 30 and the remainder of the air passing upwardly out of an opening 33 at the top of the dissipator.

Figure 6:
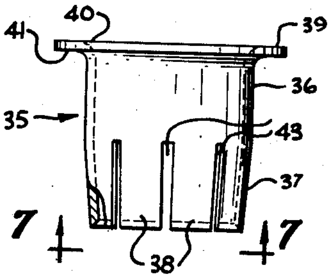
Figure 6 is a side elevational view of a second form of the invention partially broken away.
Figure 7:
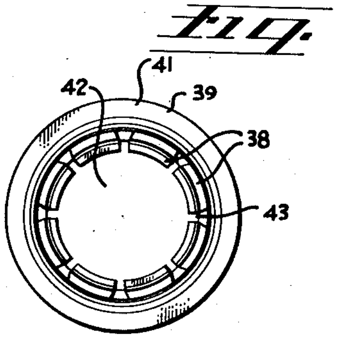
Figure 7 is a bottom view of the device of Figure 6 taken on the line 7—7 of Figure 6.
Figure 8:
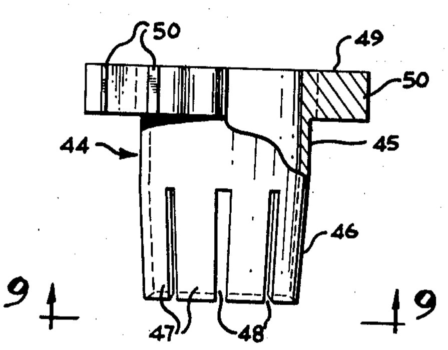
Figure 8 is a side elevational view of a third form of the device partially broken away to show the interior structure.

In the form of device illustrated in Figures 6 and 7, a dissipator 35 is formed into what may be identified as an end portion 36 which is circumferentially continuous and an end portion 37 which is made up of a series of spring fingers 38 providing slits 39 therebetween. The spring fingers slope obliquely inwardly from the lower end of the end portion 36 whereby to grip the transistor. It is expected that the transistor jacket will not extend as much as half the distance between the lower end of the dissipator and the upper end, similar to the proportionate location of the transistor jacket 23 illustrated in Figures 3 and 4. This is advantageous in providing ample opportunity for air to pass between the slits 43 and to circulate freely around the transistor jacket on its way upwardly and outwardly at the top. There is, additionally, provided on the end portion 36 an annular flange 39 which is an integral portion of the dissipator and which extends a substantial distance outwardly presenting an upper face 40 and a lower face 41 by means of which heat can be dissipated. The flange being annular in shape and extending outwardly, leaves an opening 42 at the top of the dissipator through which air heated by the presence of the transistor can pass.

Figure 9:
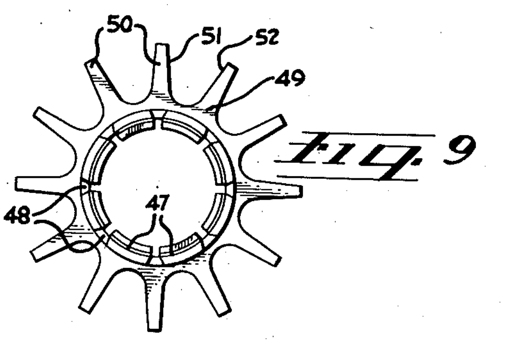
Figure 9 is a bottom view taken on the line 9—9 of Figure 8.
Figure 10:
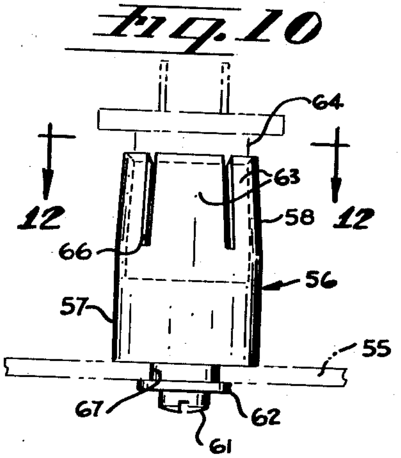
Figure 10 is a side elevational view of a fourth form of the invention suggesting a means of mounting upon a chassis or heat sink and with a transistor in place thereon.

A somewhat similar structure is illustrated in Figure 9 wherein a dissipator indicated generally by the reference character 44 has an upper end portion 45 which is circumferentially continuous and a lower end portion 46 consisting of a series of fingers 47 separated by slits 48. Here again the spring fingers slope inwardly so as to be abl to grasp the transistor jacket.

In this form of the device, there is provided at the upper extremity of the end portion 45 an enlargement in the form of a ring 49 which consists of a multiplicity of radially extending fins 50 which have a progressively increasing thickness at the innermost ends. The fins present flat faces 51 and 52 which lie in a position substantially parallel to the axis of the body of the dissipator 44. In practice, the ring 49 may be made separately and applied to the body of the dissipator affixed by some appropriate brazing or welding technique, or on occasion the entire dissipator may be constructed from an initially extruded form.

Figure 11:
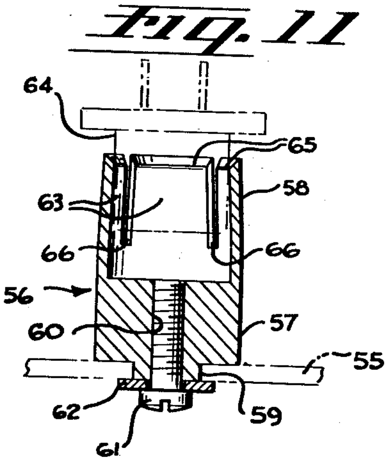
Figure 11 is a longitudinal sectional view of the device shown in Figure 10 and taken on the line 11—11 of Figure 12.

In the form of device illustrated in Figures 10, 11, 12 and 13, the dissipator is one adapted itself to be attached to a chassis 55 of an electronic device. The chassis may be of metallic material or may contain a separate sheet of metallic material within the chassis serving as a heat sink. In the embodiment illustrated in Figures 10 and 11, a shield indicated generally by the reference character 55 is one consisting of a lower end portion 57 and an upper end portion 58. The lower end portion is solid as illustrated in Figure 11, and at its lower extremity is provided with a boss 59 which has a thickness comparable to the thickness of the chassis portion 55. In the solid body of the end portion 57 there is formed a threaded aperture 60 and a screw 61 extends threadedly into the aperture, thereby to secure the dissipator to the chassis. A washer 62 is employed, this being preferably a washer of an appropriate dielectric material so that when the dissipator 56 is coated with a dielectric coating of the type hereinabove described in connection with the descriptions of Figures 1 and 2, there will be no electric contact between the dissipator and the chassis and this relationship will be preserved by the presence of the washer 62 even though an electric contact is made between the threads of the screw and those of the opening 60.

In this form of the device the end portion 58 is provided with spring fingers 63 which slope obliquely inwardly whereby to grasp the exterior of a jacket 64 of a transistor inserted therein. Attention is directed to the presence of rounded edge portions 65 on the fingers which, especially when coated with the coating film having a low coefficient of friction, materially assist in the easy insertion and withdrawal of the jacket 64. Here again the presence of slits 66 between the spring fingers assists in the circulation of air around the exterior of the jacket which, except for being gripped by the edge portions 65, is relatively clear of the interior of the dissipator. In this form of the device, the dissipator picks up heat from the transistor jacket by conduction and also by radiation against the inside faces of the fingers and other portions of the dissipator. The heat absorbed by the dissipator in this fashion is passed downwardly to the lower extremity of the end portion 57 and the boss 59 and from there passed by conduction to the chassis 55.

Figures 12, 13:
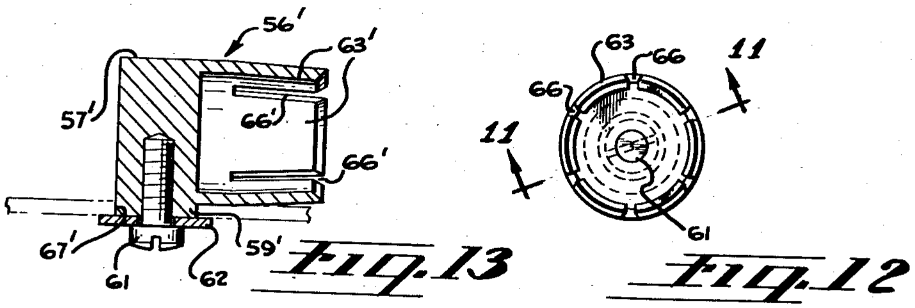
Figure 12 is a plan view of the device of Figures 10 and 11 taken on the line 12—12 of Figure 10.
Figure 13 is a longitudinal sectional view of the device of Figure 10 designed for side mounting.
Figure 14:
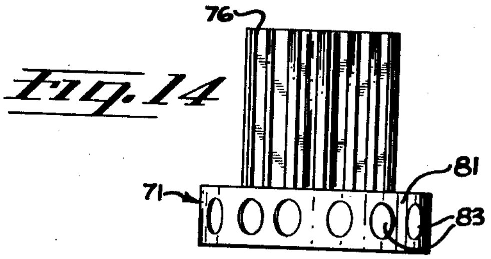
Figure 14 is a side elevational view of still another form of device.
Figure 16:
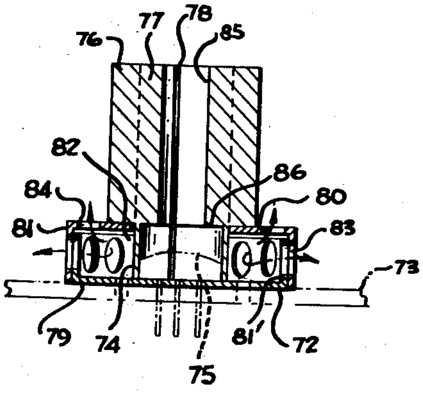
Figure 16 is a longitudinal sectional view taken on the line 16—16 of Figure 15.
Figure 15:
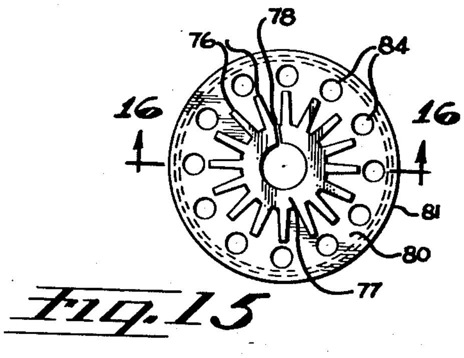
Figure 15 is a plan view of the device of Figure 14.

Although the dissipator 56 is shown mounted upright, it is possible to mount the dissipator in horizontal direction as exemplified by the dissipator 56' in the position illustrated in Figure 13. When this form of device is resorted to, a boss 59' is provided on a side face of an end portion 57' whereby to be admitted into a suitable bore 67' in the chassis wherein it is retained in a similar fashion by means of a screw 61 and dielectric washer 62. Spring fingers 63' are employed to retain a transistor in the same fashion as previously described. Convection cooling of the device in this position is improved by having slits 66' lying in a horizontal position.

Where considerable more cooling effect may be needed as, for example, when the transistor is a power transistor, the form of device illustrated in Figures 14, 15 and 16 may be considered especially advantageous. As there shown, the dissipator is comprised of a body 71 and a base 72 mounted together upon a chassis 73. The body consists of a lower end portion 74 which consists of a somewhat expandable ring adapted to engage over and fit upon a jacket 75 of a transistor. Above the end portion 74 is a series of fins 76 retained together by the agency of a binding ring 77 which in reality is a split ring provided on one side with a split 78. The split, as indicated in Figure 16, extends throughout the entire length of the body through the end portion 74 and hence provides the end portion 74 with its expandable character making it an expandable ring.

The base has a bottom wall 79, a top wall 80 parallel thereto and an annular vertical side wall structure identified by an outer side wall element 81 extending downwardly from the top wall and an inner side wall element 81' extending upwardly from the bottom wall 79. These inner and outer side wall elements telescope together as illustrated in Figure 16. The walls form a chamber 82 which may aptly be described as a circulation chamber. In the side wall elements are openings 83 which communicate between the chamber 82 and the exterior in a horizontal direction. Openings 84 in the top wall 80 communicate upwardly between the chamber and the exterior. The general distribution and location of the openings are readily discernible in Figures 14 through 16, inclusive. It should also be noted that a bore 85 extends upwardly from a space 86 immediately surrounding the transistor jacket 75 through the ring 77 and outwardly at the top. This provides a stack effect for air which arises due to heating by the transistor. This heated air passes heat to the ring 77 and thence to the fins 76 thereby to be dissipated. This is in addition to heat absorbed by the ring and appurtenances by radiation. In this form various means may be employed for securing the body 71 to the base 72 such as a friction fit, some adhesion means such as welding or by the use of screws (not shown). In the forms of invention herein described in detail, it will be noted that advantage is taken of the employment of heat dissipation by convection means in that space is left around the outside of the transistor jacket. Constructed as noted there is ample opportunity for air to be heated immediately adjacent the jacket and then travel upwardly through the dissipator. During the upward passage heat is absorbed by the dissipator ultimately to be dissipated by the surface structure of the dissipator itself when a great amount of dissipation is needed as, for example, when the transistor is a power component a very large amount of surface is needed to take the place of a heat sink of large area. Where only a relatively small amount of heat needs to be dissipated, considerably less area can be employed successfully. Moreover, in all instances, the dissipator is so constructed that it exerts a very powerful and firm grip upon the transistor over a limited area, and this grip is achieved by a smooth sliding motion so that regardless of how many times the dissipator may be placed upon the transistor and removed therefrom, there will be a minimum of opportunity to damage the transistor.

Conduction to the dissipator plays an important part in the transfer of heat away from the transistor. Radiation and convection is also stressed in passing heat from the dissipator to the surrounding environment. When transistors are provided with a dissipator of the type herein provided, the transistor presents an exceedingly small package, not very much greater than the transistor itself, and hence the singular advantage inherent in the small volume occupied by the transistor in proportion to its performance is taken virtually full advantage of.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent structures and methods.

Having thus described my invention, what I claim as new and desire to secure by Letters Patent is:

1. A heat dissipator for transistors comprising a substantially cylindrical body, one end portion of said body comprising an expandable transistor gripping ring having an inside circumference greater than that of the transistor and adapted to contain the entire length of the transistor, said end portion having an inwardly facing edge, the other end portion of said body being circumferentially continuous throughout a distance in excess of one-half the length of the body, and having a heat dissipating mass and surfaces thereon extending throughout the length of said other end portion.

2. A heat dissipator for transistors comprising a substantially cylindrical body, a coating on said body comprising a composite film of from .0005 to .001 inch in thickness of a film which is black in color and comprising a synthetic plastic resin and molybdenum disulphide, said film having a low coefficient of friction, one end portion of said body comprising an expandable transistor gripping ring having an inside circumference greater than that of the transistor and adapted to contain the entire length of the transistor, said end portion having a rounded inwardly facing edge, the other end portion of said body being circumferentially continuous throughout a distance in excess of one-half the length of the body, and having a heat dissipating mass and surfaces thereon extending throughout the length of said other end portion.

3. An electrically non-conductive coated heat dissipating device for electric components comprising a heat dissipating portion at one end and a circumferentially extending gripping ring at the other end arranged in a substantially hollow cylindrical form for reception and retention of a component, said gripping ring comprising sheet aluminum having a surface facing said chamber of porous character, a composite film of from about .0005 to .001 inch in thickness of thermosetting non-hygroscopic synthetic polymer resin, and a filler in said film of molybdenum disulphide having a low coefficient of friction, said film having a dielectric strength of about 1,000 volts per mil of thickness and being in mechanical attachment to said surface, said film being black in color and having abrasive resistant properties and resistant to heat at temperatures up to and including about 200° C.

4. An electrically non-conductive coated heat dissipating device for transistors comprising a support of thermally conductive material, a dissipator element comprising a metal base at one end having a boss thereon extending into said support, electrically non-conductive attachment means releasably securing said base to said support in thermally conductive relationship, said dissipator element comprising a plurality of circumferentially extending metal spring fingers at the end opposite said base arranged in a substantially hollow cylindrical form with free ends of said fingers bent inwardly whereby to provide a chamber for reception and retention of a transistor, said base and said fingers having surfaces of porous character, a composite film having a mechanical bond to said surfaces of porous character and comprising thermosetting non-hygroscopic synthetic polymer resin and mixed with finely divided molybdenum disulphide, said film having a low coefficient of friction and a dielectric strength of about 1,000 volts per mil of thickness, said film being black in color and resistant to heat at temperatures up to and including about 200° C.

5. An electrically non-conductive coated heat dissipating device for transistors comprising a support of thermally conductive material, a dissipator element comprising a metal base at one end having a boss thereon extending into said support, electrically non-conductive attachment means releasably securing said base to said support in thermally conductive relationship, said dissipator element comprising a plurality of circumferentially extending metal spring fingers at the end opposite said base arranged in a substantially hollow cylindrical form with free ends of said finger bent inwardly whereby to provide a chamber for reception and retention of the transistor, the metal of said dissipator having a surface of porous character, a composite film of from about .0005 to .001 inch in thickness of a mixture of thermosetting non-hygroscopic synthetic polymer resin and molybdenum disulphide, said film having a dielectric strength of about one thousand volts per mil of thickness and being in mechanical attachment to said surface, said composite film being black in color and resistant to heat at temperatures up to and including about 200° C.

6. An electrically heat dissipating device for transistors comprising a support of thermally conductive material, a dissipator element comprising a solid base having a boss thereon extending into said support, electrically non-conductive attachment means releasably securing said base to said support in thermally conductive relationship, said dissipator element comprising a plurality of circumferentially extending metal spring fingers arranged in a substantially hollow cylindrical form with free ends of said fingers bent inwardly whereby to provide a chamber for reception and retention of a transistor.

7. A heat dissipator for transistors comprising a circumferentially continuous substantially cylindrical body of sheet metal, one end of said body being divided into a plurality of separate inwardly sloping spring fingers having smooth inner end edges, the other end of said body having a plurality of inwardly sloping tabs, opening means in said other end adjacent said tabs whereby said tabs have positions adapted to direct air arising inside said body partially through said opening means and partially in a turbulent course upwardly within said body, said body being adapted to be pressed over a transistor with the edges of said fingers in spring pressed engagement with the transistor near the base thereof and with said transistor lying within the body at a location below said opening means.

8. A heat dissipator for transistors comprising a circumferentially continuous substantially cylindrical body of sheet metal, one end of said body being divided into a plurality of laterally spaced separate inwardly sloping spring fingers having smooth inner end edges, the other end of said body having a plurality of inwardly sloping tabs cut from said body forming openings in said other end with said tabs having a position adapted to direct air passing between said fingers into contact with said transistor partially through said openings and partially in a turbulent course upwardly within said body, said body being adapted to be pressed over a transistor with the edges of said fingers in spring pressed engagement with the transistor near the base thereof and with said transistor lying within the body at a location below said openings.

9. A heat dissipator for transistors comprising a substantially cylindrical body of sheet material, one end of said body being divided into a plurality of separate inwardly sloping spring fingers having smooth inner end edges and forming spaces therebetween, the other end of said body being circumferentially continuous and at the outermost edge thereof having an enlargement extending radially outwardly from said outermost edge, said enlargement comprising an annular flange integral with the body and lying in a plane perpendicular to the axis of the body.

10. A heat dissipator for transistors comprising a substantially cylindrical body of sheet material, one end of said body being divided into a plurality of separate inwardly sloping spring fingers having smooth inner end edges and forming spaces therebetween, the other end of said body being circumferentially continuous and at the outermost edge having an enlargement extending radially outwardly from said outermost edge, said enlargement comprising a multiplicity of radially protruding relatively flat fins with flat faces thereof parallel to the axis of said body, and a ring of solid metal joining the bases of said fins.

11. A heat dissipator for transistors comprising a hollow substantially cylindrical body, one end of said body comprising an expandable transistor gripping ring adapted to be pressed into a friction retained engagement with the transistor, another end of said body having a multiplicity of radially extending fins and extending throughout the length of said other end, and a ventilating base for the body comprising walls forming an annular outer wall surrounding said ring, and means forming a multiplicity of openings in said wall productive of circulatory air passage means around said ring and directed toward said fins.

12. A heat dissipator for transistors comprising a substantially cylindrical body, one end portion of said body comprising an expandable transistor gripping ring adapted to be pressed into a friction retained engagement with the transistor, another end portion of said body having a multiplicity of radially extending fins having flat faces substantially parallel to the axis of the body and extending throughout the length of said other end portion, a split cylindrical ring extending throughout the length of said other end portion and joining said fins together at the bases thereof, and a ventilating base for the body comprising upper and lower parallel walls and an annular outer wall forming an annular circulation chamber around said ring, a multiplicity of openings in said annular outer wall and a multiple series of openings in said upper parallel wall productive of circulatory air passage means around said ring and directed toward said fins.

References Cited in the file of this patent

UNITED STATES PATENTS 2,820,929 Coy ------------------ Jan. 21, 1958
2,820,930 Coy et al. -------------- Jan. 21, 1958